(12) United States Patent
Paller

(10) Patent No.: US 11,937,728 B2
(45) Date of Patent: Mar. 26, 2024

(54) HIGH TEMPERATURE COOKING ACCESSORY FOR AN OVEN APPLIANCE

(71) Applicant: Haier US Appliance Solutions, Inc., Wilmington, DE (US)

(72) Inventor: Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/742,635

(22) Filed: May 12, 2022

(65) Prior Publication Data
US 2023/0363565 A1 Nov. 16, 2023

(51) Int. Cl.
*A47J 27/00* (2006.01)
*A47J 36/06* (2006.01)
*F24C 3/12* (2006.01)

(52) U.S. Cl.
CPC ............. *A47J 27/002* (2013.01); *A47J 36/06* (2013.01); *F24C 3/128* (2013.01)

(58) Field of Classification Search
CPC .......... A47J 27/002; A47J 36/06; F24C 3/128
USPC ...................................................... 220/573.1
See application file for complete search history.

(56) References Cited

U.S. PATENT DOCUMENTS

| | | | |
|---|---|---|---|
| 10,101,038 B2 | 10/2018 | Kim et al. | |
| 10,876,738 B2 * | 12/2020 | Touma | F24B 1/182 |
| 11,684,210 B2 * | 6/2023 | Bert | F24B 15/005 |
| | | | 426/235 |
| 2019/0195506 A1 * | 6/2019 | Tseng | F24C 3/047 |
| 2021/0222889 A1 | 7/2021 | Johnson et al. | |
| 2022/0322877 A1 * | 10/2022 | Greer | A47J 37/0658 |

FOREIGN PATENT DOCUMENTS

| | | | |
|---|---|---|---|
| CN | 105795937 A | * | 7/2016 |
| CN | 206166694 U | * | 5/2017 |
| CN | 218126606 U | * | 12/2022 |
| CN | 115777737 A | * | 3/2023 |
| KR | 20090007519 U | | 7/2009 |
| WO | WO-2022248520 A1 | * | 12/2022 |

* cited by examiner

*Primary Examiner* — J. Gregory Pickett
*Assistant Examiner* — Niki M Eloshway
(74) *Attorney, Agent, or Firm* — Dority & Manning, P.A.

(57) ABSTRACT

A cooking accessory receivable within a cooking chamber of an oven appliance includes a base plate to receive a food item thereon, an enclosing lid disposed over the base plate, the enclosing lid defining a main inlet and an access opening, the main inlet being defined along the vertical direction and the access opening being defined along the transverse direction, and a guide plate attached to an interior surface of the enclosing lid above the base plate, wherein the base plate and the enclosing lid form a high temperature chamber for the food item, the high temperature chamber being in fluid communication with the cooking chamber.

19 Claims, 4 Drawing Sheets

HIGH TEMPERATURE COOKING ACCESSORY FOR AN OVEN APPLIANCE

FIELD OF THE INVENTION

The present subject matter relates generally to oven appliances, and more particularly to cooking accessories for high temperature operations within oven appliances.

BACKGROUND OF THE INVENTION

Conventional ovens are household appliances used to cook or reheat food items or cooking utensils, such as baking dishes or pans. A user may place a food item or cooking utensil into an oven cavity to be heated. For example, certain oven appliances include heating elements such as an electrical heating element or a gas burner. The food item or cooking utensil may be heated by conduction, convection, or radiation.

Some conventional ovens have a gas burner typically placed at the bottom of the oven cavity (e.g., beneath a lower wall or bottom plate of a cooking chamber). Outlet ports on the gas burner may face or supply heat to a bottom panel of the oven cavity, which may include one or more outlets providing fluid communication to the oven cavity. However, conventional burners are only capable of safely reaching a limited temperature within the oven cavity, which restricts certain operations from being performed to desired results.

Accordingly, an oven appliance which obviates one or more of the above-mentioned drawbacks would be desirable. In particular, a high temperature cooking accessory within an oven cavity would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking accessory receivable within a cooking chamber of an oven appliance is provided. The cooking accessory may include a base plate to receive a food item thereon, an enclosing lid disposed over the base plate, the enclosing lid defining a main inlet and an access opening, the main inlet being defined along the vertical direction and the access opening being defined along the transverse direction, and a guide plate attached to an interior surface of the enclosing lid above the base plate. The base plate and the enclosing lid may form a high temperature chamber for the food item, the high temperature chamber being in fluid communication with the cooking chamber.

In another exemplary aspect of the present disclosure, an oven appliance is provided. The oven appliance may include a cabinet forming a cooking chamber and a heating element chamber provided below the cooking chamber, the cabinet including a control panel; a heating element provided within the heating element chamber; a cooking accessory positioned between the heating element chamber and the cooking chamber, the cooking accessory forming a high temperature chamber in fluid communication with the cooking chamber; a high temperature sensor positioned within the high temperature chamber, the high temperature sensor configured to monitor a temperature within the high temperature chamber; and a cooking chamber temperature sensor positioned within the cooking chamber, the cooking chamber temperature sensor configured to monitor a temperature within the cooking chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
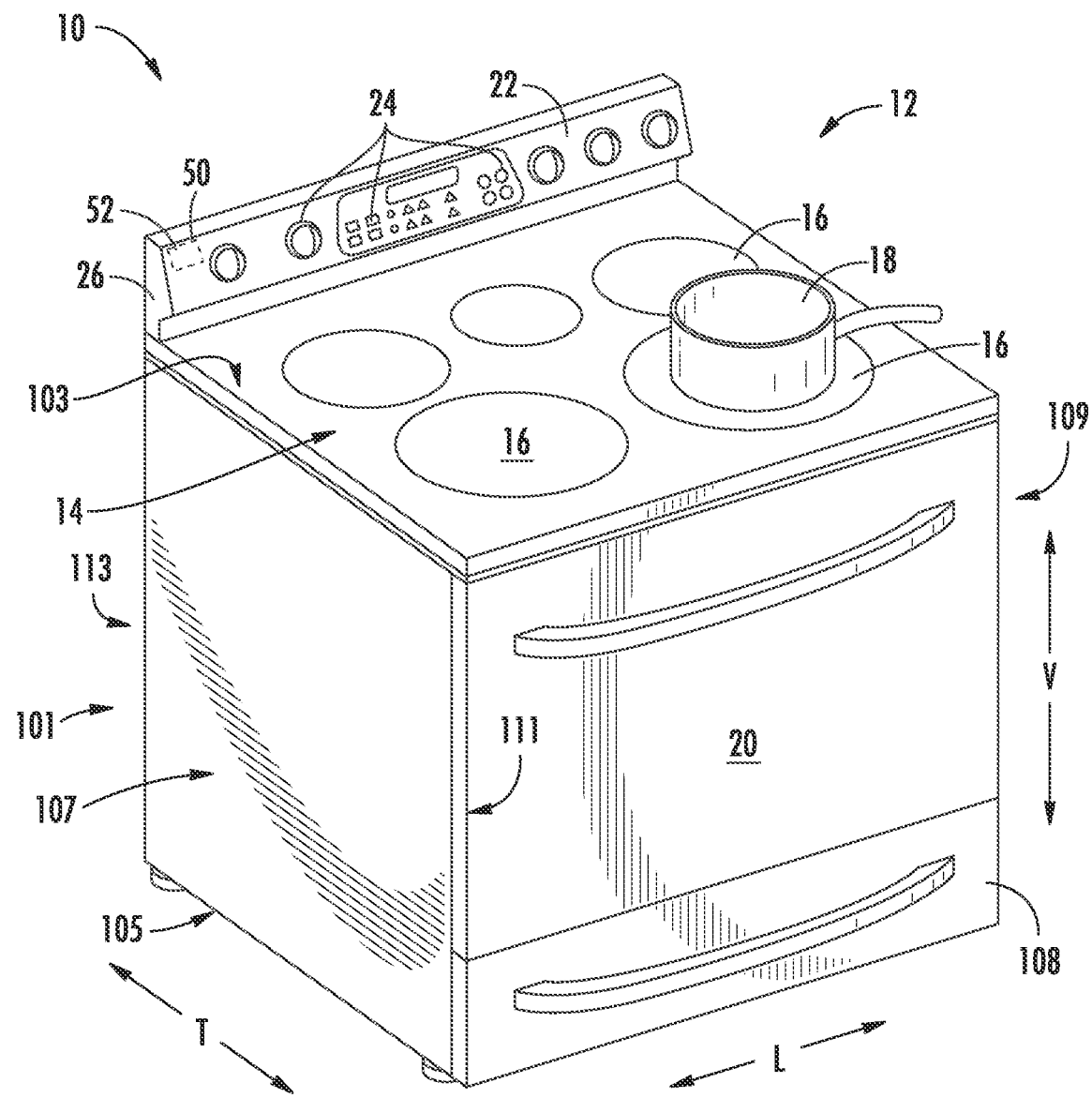
FIG. 1 provides a perspective view of an oven appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
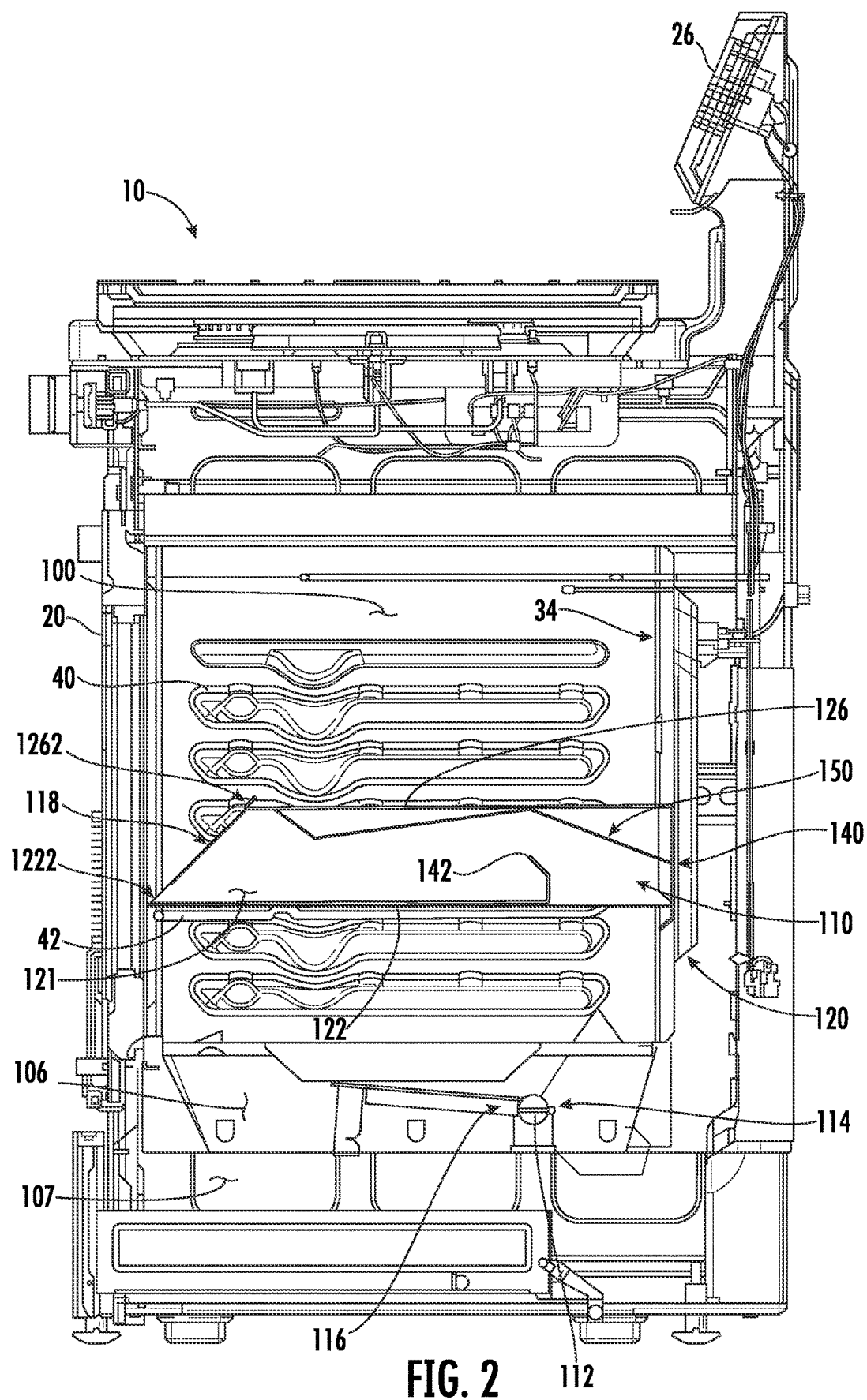
FIG. 2 provides a side section view of the exemplary oven appliance of FIG. 1.

FIG. 1 provides a perspective view of an oven appliance, or oven range 10, including a cooktop 12, and FIG. 2 provides a side cut-away view of the oven appliance. Oven appliance 10 is provided by way of example only and is not intended to limit the present subject matter to the arrangement shown in FIGS. 1 and 2. Thus, the present subject matter may be used with other range and/or cooktop configurations, e.g., double oven range appliances. As illustrated, oven appliance 10 generally defines a vertical direction V, a lateral direction L, and a transverse direction T, each of which is mutually perpendicular, such that an orthogonal coordinate system is generally defined. Oven appliance 10 includes a cabinet 101 that extends between a top 103 and a bottom 105 along the vertical direction V, between a left side 107 and a right side 109 along the lateral direction, and between a front 111 and a rear 113 along the transverse direction T.

Cabinet 101 may include a cooking chamber 100. For instance, cooking chamber 100 may be defined by a plurality of sidewalls including opposing sidewalls 30 (FIG. 2), bottom wall 32 (described in more detail below), back wall 34, and top wall 36 that define cooking chamber 100. Bottom wall 32 and top wall 36 are spaced apart along the vertical direction V, and sidewalls 30 extend along the vertical direction V between top wall 36 and bottom wall 32. Back wall 34 extends between sidewalls 30 along the lateral direction L and also extends between top wall 36 and bottom wall 32 along the vertical direction V.

Sidewalls 30 may include supports 40 (FIG. 2) for supporting oven racks 42 (FIG. 2) that may be selectively positioned within chamber 100. Oven racks 42 may include a top rack and a bottom rack. Top rack 42 is positioned above bottom rack 42 along the vertical direction V. Additional supports 40 may be provided at or near a bottom of cooking chamber 100 to support bottom wall 32, which will be described in further detail below. Moreover, additional racks may be included within cooking chamber 100, such as one or more intermediate racks.

The oven appliance 10 may also include a door 20 with handle that provides for opening and closing access to a cooking chamber 100. A user of the oven appliance 10 can place a variety of different items to be cooked in chamber 100 onto racks 40. Heating elements (e.g., burner 112 described below) may be positioned at the top and the bottom of chamber 100 to provide heat for cooking and cleaning. Such heating element(s) can be e.g., gas, electric, microwave, or a combination thereof. Other heating elements (not shown) could be located at other locations as well. A window 110 on door 20 allows the user to view e.g., food items during the cooking process.

Bottom wall 32 may divide cabinet 101 into cooking chamber 100 and a burner housing 106. In some embodiments, burner housing 106 is provided below cooking chamber 100 (e.g., under bottom wall 32). Bottom wall 32 may include an outlet port defined therein. In some embodiments, the outlet port is provided at or near a rear of bottom wall 32 (e.g., proximate a rear of oven appliance 10 opposite door 20). The outlet port may be a first outlet port and may allow fluid communication between cooking chamber 100 and burner housing 106 through the bottom wall. For example, air heated in burner housing 106 may pass into cooking chamber 100 via the first outlet port. According to some embodiments, a second outlet port is provided at or near a front of bottom wall 32. For instance, the second outlet port may define a second fluid passageway between burner housing 106 and cooking chamber 100. Heat, heated air, or gas from burner housing may thus enter cooking chamber via either the first or second outlet port.

Although a single outlet port is illustrated and described herein, it should be appreciated that any suitable, number, size, position, and configuration of outlet ports could be used while remaining within the scope of the present subject matter. For example, in some embodiments, multiple outlet ports may be defined in bottom wall 32. In these embodiments, the outlet ports may be spaced apart from each other in the lateral direction L. Additionally or alternatively, as will be explained in more detail below, a plurality of outlet ports in fluid series with each other may be provided.

Oven appliance 10 may include a burner 112. Burner 112 may be provided beneath bottom wall 32 (e.g., within burner housing 106). Burner 112 may be a gas burner (e.g., a burner using a gas fuel to create a flame to produce heat). However, it should be understood that any suitable or heat source may be utilized or incorporated. Burner 112 may have any suitable shape, for example, cylindrical, pancake (e.g., flat), square, etc. Burner 112 may be oriented such that a longitudinal axis of burner 112 extends in the lateral direction L. As such, burner 112 may define a first end proximate a first lateral side of cooking chamber 100 and a second end opposite the first end and proximate a second lateral side of cooking chamber 100. Further, burner 112 may be provided in plurality under bottom wall 32. For example, two burners 112 may be provided and spaced apart from each other along the lateral direction L. For another example, two burners 112 may be provided and spaced apart from each other along the transverse direction T (e.g., a first burner at a rear of cooking chamber 100 and a second burner at a front of cooking chamber 100).

Burner 112 may include a plurality of first gas ports 114. The plurality of first gas ports 114 may be defined in an outer surface of burner 112. In one example, when burner 112 is a cylindrical burner, first gas ports 114 are defined in the circumferential surface of burner 112. In another example, when burner 112 is a pancake burner, first gas ports 114 are defined in a side panel of burner 112. According to an exemplary embodiment, first gas ports 14 may face toward the outlet port or may otherwise direct a flame and/or heated gas toward the outlet port. For example, according to the illustrated embodiment, first gas ports 114 may face substantially toward the rear of burner housing 106, e.g., such that the outlet port is positioned between burner 112 and a rear wall of burner housing 106 along the transverse direction T.

Burner 112 may further include a plurality of second gas ports 116. The plurality of second gas ports 116 may be defined in an outer surface of burner 112. In one example, when burner 112 is a cylindrical burner, second gas ports 116 are defined in the circumferential surface of burner 112. In another example, when burner 112 is a pancake burner, second gas ports 116 are defined in a side panel of burner 112. Second gas ports 116 may face substantially toward the front of burner housing 106 (e.g., toward the door 20) and away from the outlet port. The plurality of second gas ports 116 may be fewer in number than the plurality of first gas ports 114 (e.g., there may be a fewer total number of second gas ports 116 than first gas ports 114). Additionally or alternatively, a size of each of the plurality of second gas ports 116 may be smaller than a size of each of the plurality of first gas ports 114. The size of each of first gas ports 114 and second gas ports 116 may be measured by gas port area (e.g., a cross-sectional area of the gas port). Additionally or alternatively, heat, heated air, or gas from second gas ports 116 may enter cooking chamber 100 via a second outlet port provided in bottom wall 32 (e.g., near a front of cooking chamber 100).

A cooking surface 14 of cooktop 12 may include a plurality of heating elements 16. For the embodiment depicted, the cooktop 12 includes five heating elements 16 spaced along cooking surface 14. The heating elements 16 are generally electric heating elements and are positioned at, e.g., on or proximate to, the cooking surface 14. In certain exemplary embodiments, cooktop 12 may be a radiant cooktop with resistive heating elements or coils mounted below cooking surface 14. However, in other embodiments, the cooktop appliance 12 may include any other suitable shape, configuration, and/or number of heating elements 16, for example, the cooktop 12 may be an open coil cooktop with the heating elements 16 positioned on or above surface 14. Additionally or alternatively, in other embodiments, the cooktop 12 may include any other suitable type of heating element 16, such as an induction heating element. Each of the heating elements 16 may be the same type of heating element 16, or cooktop 12 may include a combination of different types of heating elements 16.

A control panel 22 having controls 24 may permit a user to make selections for cooking of food items (e.g., within cooking chamber 100 or on cooking surface 14). Although shown on a backsplash or back panel 26 of oven appliance 10, control panel 22 may be positioned in any suitable location. Controls 24 may include buttons, knobs, and the like, as well as combinations thereof, and/or controls 24 may be implemented on a remote user interface device such as a smartphone. As an example, a user may manipulate one or more controls 24 to select a temperature and/or a heat or power output for each heating element 16 and the cooking chamber 100. The selected temperature or heat output of heating element 16 affects the heat transferred to cooking utensil 18 placed on heating element 16.

The cooktop appliance 12 includes a control system 50 for controlling one or more of the plurality of heating elements 16 and the cooking chamber 100. Specifically, the control system 50 may include a controller 52 operably connected to the control panel 22 and controls 24. The controller 52 may be operably connected to each of the plurality of heating elements 16 for controlling a power supply to each of the plurality of heating elements 16 in response to one or more user inputs received through the control panel 22 and controls 24.

The cooktop appliance 12 may include a drawer recess 104, into which a drawer assembly 108 may be inserted. Drawer recess 104 may be provided underneath cooking chamber 100, for example. A user may store various items (e.g., cooking utensils 18 or the like) within drawer recess 104. Additionally or alternatively, drawer recess 104 may be used as a temporary storage area for food (e.g., as a warming zone or area). According to some embodiments, drawer recess 104 may be an additional cooking or baking zone, in which food items may be cooked or baked. It should be noted that drawer recess 104 may be used for any suitable purposes, and the disclosure is not limited to those examples given herein. An opening to drawer recess 104 may be defined in the lateral direction L and vertical direction V. In detail, drawer recess 104 may be configured such that drawer assembly 108 is withdrawn in the transverse direction T from drawer recess 104.

Figure 3:
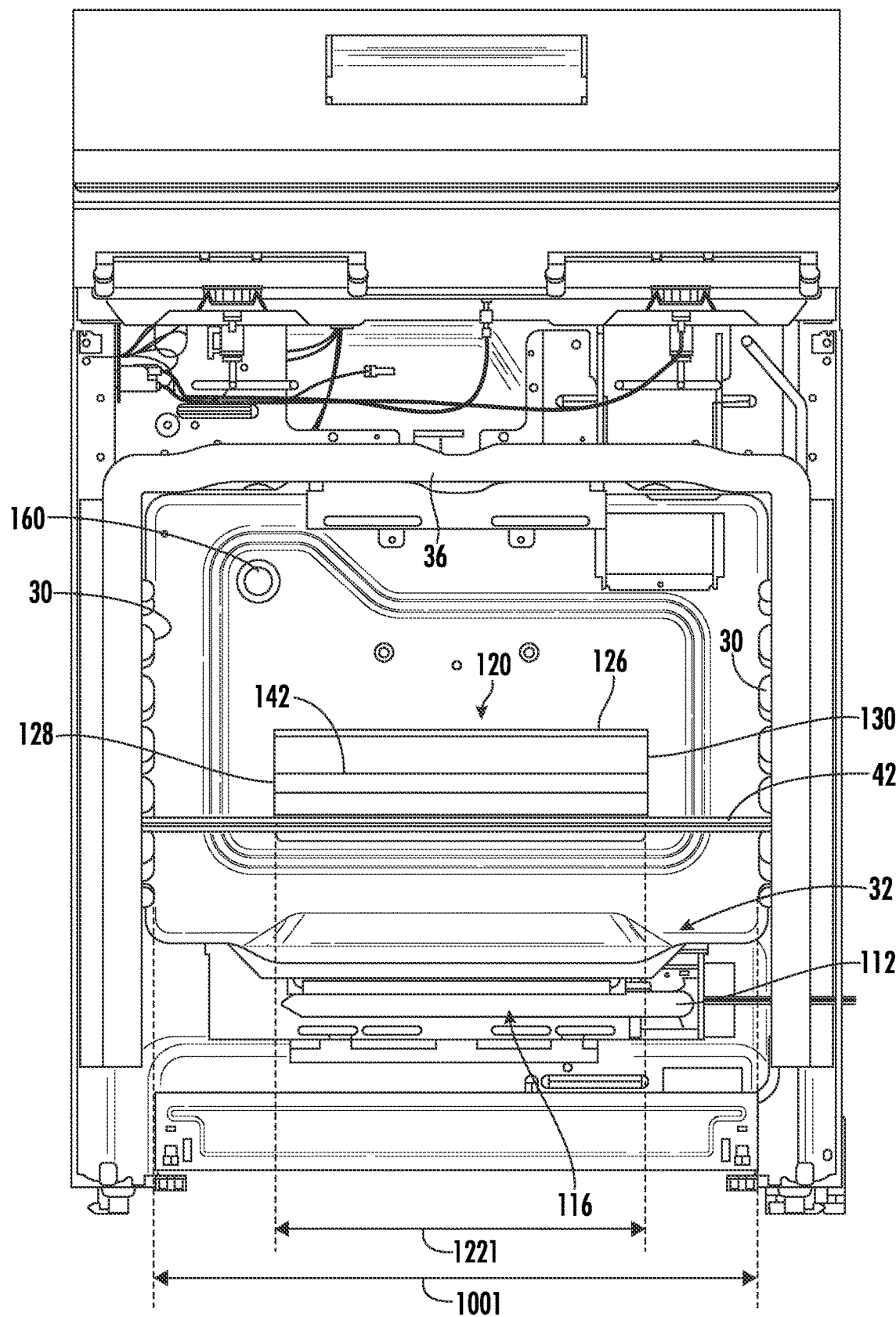
FIG. 3 provides a front view of the exemplary oven appliance of FIG. 1
Figure 4:
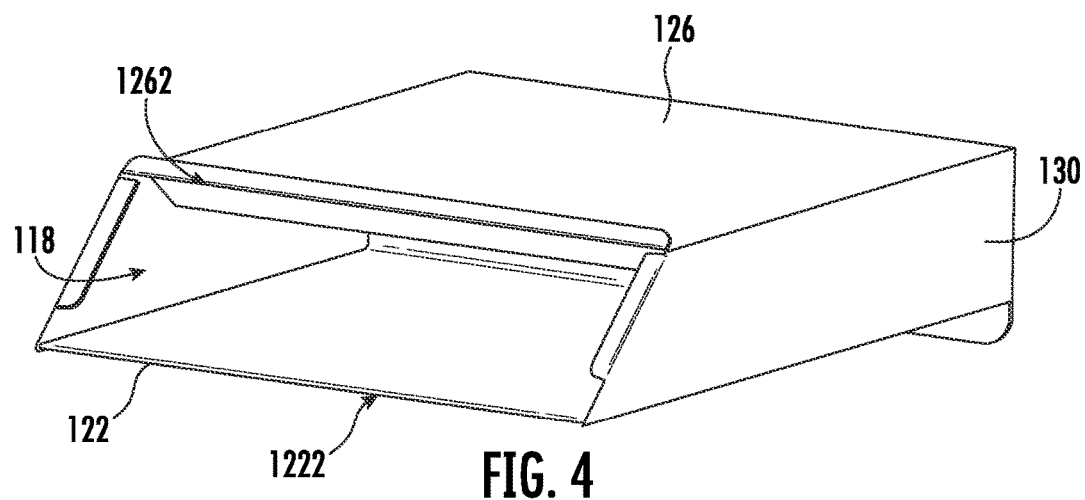
FIG. 4 provides a perspective view of a cooking accessory according to exemplary embodiments of the present disclosure.
Figure 5:
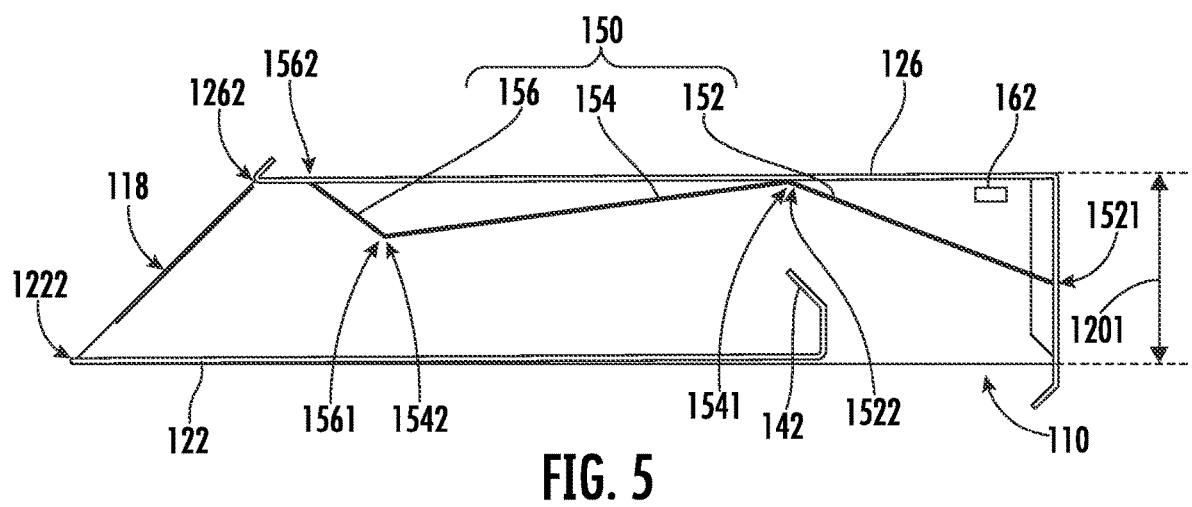
FIG. 5 provides a front view of the exemplary cooking accessory of FIG. 4.

FIGS. 2 and 3 illustrate a cooking accessory 120 installed within cooking chamber 100 of oven appliance 10. FIGS. 4 and 5 illustrate cooking accessory 120 outside of cooking chamber 100. Hereinafter, cooking accessory 120 will be described in detail with reference to FIGS. 2 through 5. Cooking accessory 120 may be receivable within cooking chamber 100 (e.g., as shown in FIGS. 2 and 3). For instance, cooking accessory 120 may be removably positioned within cooking chamber 100 (e.g., at a variety of interchangeable positions). In at least one embodiment, cooking accessory 120 is provided as bottom wall 32 of cooking chamber 100. In detail, cooking accessory 120 may operate as the divider between cooking chamber 100 and burner housing 106. As will be described below, a top surface or plate of cooking accessory 120 may define a bottom surface of cooking chamber 100. Additionally or alternatively, a bottom surface or base plate 122 of cooking accessory 120 may define a top surface of burner housing 106.

Cooking accessory 120 may form a high temperature chamber 121. For instance, cooking accessory 120 may be formed so as to allow a high temperature cooking operation to be performed therein (e.g., such as a pizza cooking operation). For instance, high temperature chamber 121 may be at least partially separated from cooking chamber 100 (e.g., by one or more plates, panels, or physically isolating elements). However, cooking chamber 100 and high temperature chamber 121 may also be in thermal or fluid communication with each other. For instance, heat from burner 112 may first be supplied to cooking accessory 120 (e.g., high temperature chamber 121) before flowing with air into cooking chamber 100, as will be described in more detail below.

Cooking accessory 120 may include a base plate 122. Base plate 122 may selectively receive a food item thereon for a cooking operation (e.g., the high temperature cooking operation). Base plate 122 may form a bottom portion of cooking accessory 120 or a bottom portion of high temperature chamber 121. According to at least some embodiments, base plate 122 may be capable of reaching elevated temperatures (e.g., equal to or greater than about 800° Fahrenheit). According to some embodiments, base plate 122 may be formed from a metal such as steel, a stone or ceramic, a high temperature composite, or the like.

Generally, base plate defines a (e.g., horizontal) cooking surface. When assembled, base plate 122 may extend predominantly along the lateral direction L and the transverse direction T. For instance, a width 1221 of base plate 122 along the lateral direction L may be a predetermined percentage of a width 1001 of cooking chamber 100. Width 1221 of base plate 122 may be between about 50% and about 75% of width 1001 of cooking chamber 100. Thus, base plate 122 may be spaced apart from interior sidewalls 30 of cooking chamber 100. As shown particularly in FIG. 3, for instance, base plate 122 (e.g., cooking accessory 120) may be predominantly centered within cooking chamber 100 (e.g., along the lateral direction L). Advantageously, as will be described in more detail below, heat, heated air, or gas from burner housing 106 may be easily supplied to cooking chamber 100 (e.g., after being supplied to cooking accessory 120).

Cooking accessory 120 may include an enclosing lid 124. Enclosing lid 124 may be disposed or provided over base plate 122. According to some embodiments, enclosing lid 124 is attached to base plate 122 (e.g., at lateral sides thereof). However, in additional or alternative embodiments, enclosing lid 124 is attached to cooking chamber 100 directly (e.g., at the sidewalls or back wall thereof). When assembled, at least a portion of enclosing lid 124 may be spaced apart from base plate 122 by a predetermined distance. In detail, a distance between enclosing lid 124 and base plate 122 may be defined as a height 1201 (e.g., maximum height) along the vertical direction V. Height 1201 may be shorter than width 1221. According to at least some embodiments, the ratio of height 1201 to width 1221 is between about 1:3 and about 1:5.

Enclosing lid 124 may include a top plate 126. For instance, top plate 126 may be disposed above base plate 122 (e.g., along the vertical direction V). Accordingly, height 1201 may be defined between base plate 122 and top plate 126. Top plate 126 may be predominantly parallel with base plate 122. However, according to some embodiments, top plate 126 may be curved. For instance, top plate may be convex upward along the vertical direction V, forming a dome shape over base plate 122. It should be understood that top plate 126 may have any suitable shape (e.g., to form a high temperature chamber 121 between top plate 126 and base plate 122.)

Enclosing lid 124 may include a rear wall 140. Rear wall 140 may extend from top plate 126 (e.g., predominantly along the vertical direction V). For instance, rear wall 140 may extend generally downward along the vertical direction V (e.g., toward burner housing 106). Rear wall 140 may extend along the lateral direction L a distance equal to width 1221 of base plate 122. Rear wall 140 may define a rear boundary of high temperature chamber 121. Thus, rear wall 140 may be positioned at or near a rear of cooking chamber 100 (e.g., rear 113). Thus, a depth of high temperature chamber 121 along the transverse direction T may be maximized.

Enclosing lid 124 may define a main inlet 110. Main inlet 110 may allow fluid communication between burner housing 106 and high temperature chamber 121. Thus, main inlet 110 may be an opening within cooking accessory 120 through which heat, heated air, or gas may flow from burner 112 into high temperature chamber 121. Main inlet 110 may be defined between rear wall 140 and base plate 122. In detail, rear wall 140 may be spaced apart from base plate 122 along the transverse direction T. The space between rear wall 140 and base plate 122 may be referred to as the main inlet 110. As shown in FIG. 2, main inlet 110 may be positioned proximate burner 112 (e.g., a rear of burner 112). Accordingly, heat or flames released from burner 112 via first gas ports 114 may be directed toward main inlet 110 and into high temperature chamber 121.

Enclosing lid 124 may define an access opening 118. Access opening 118 may be defined at a front of enclosing lid 124. For instance, access opening 118 may be defined between top plate 126 and base plate 122. Access opening 118 may allow access to high temperature chamber 121. In detail, a user may position food within high temperature chamber 121 via access opening 118. Additionally or alternatively, access opening 118 may function as an outlet or a main outlet for heat, heated air, or gas supplied to high temperature chamber 121 via main inlet 110. The heat or heated air from burner 112 may enter main inlet 110 from a bottom rear of cooking accessory 120. The heat or heated air may then flow through high temperature chamber 121 along the transverse direction T from the rear to a front of high temperature chamber 121. The heat or heated air may then exit high temperature chamber 121 via access opening 118 and flow into cooking chamber 100.

A front edge 1222 of base plate 122 may be positioned closer to door 20 of oven appliance 10 than a front edge 1262 of top plate 126. For instance, as shown in FIG. 2, base plate 122 may be provided further forward (e.g., along the transverse direction T) than top plate 126. Accordingly, access opening 118 may be defined along the transverse direction T and along the vertical direction V. Advantageously, access opening 118 may be enlarged to allow easy access when supplying cooking products thereto (e.g., food, cooking stones, etc.). Moreover, a gap between front edge 1262 of top plate 126 and door 20 may allow the heat or heated air exiting high temperature chamber 121 to flow easily and without obstruction into cooking chamber 100.

Enclosing lid 124 may include a pair of sidewalls. For instance, the pair of sidewalls may include a first sidewall 128 and a second sidewall 130. The pair of sidewalls may be spaced apart from each other along the lateral direction L (e.g., by width 1221). According to at least some embodiments, the pair of sidewalls are connected with rear wall 140. Additionally or alternatively, the pair of sidewalls may extend from top plate 126 toward base plate 122. According to some embodiments, first and second sidewalls 128 and 130 each extend predominantly along the vertical direction V and the transverse direction T. In detail, first and second sidewalls 128 and 130 may be perpendicular to top plate 126 (or bottom plate 122). Additionally or alternatively, first and second sidewalls 128 and 130 may each be connected with base plate 122. In detail, first and second sidewalls 128 and 130 may connect top plate 126 with base plate 122 (e.g., to form high temperature chamber 121 therebetween). Thus, a height of the pair of sidewalls along the vertical direction V may be height 1201.

First and second sidewalls 128 and 130 may be spaced apart from inner sidewalls 30 of cooking chamber 100. Accordingly, lateral gaps may be formed between cooking accessory 120 and sidewalls 30. The heat, heated air, or gas emitted from second gas ports 116 may enter cooking chamber 100 via the second outlet formed in bottom wall 32. The heat, heated air, or gas may then flow up and heat base panel 122. Excess heat may then flow along the lateral direction L toward sidewalls 30, into the gaps formed between first and second sidewalls 128 and 130 and sidewalls 30 of cooking chamber 100. Advantageously, first and second sidewalls 128 and 130 of cooking accessory 120 may be heated, allowing high temperature chamber 121 to be heated from either lateral side in addition to a bottom (e.g., via base plate 122), improving and increasing a temperature within high temperature chamber 121.

Cooking accessory 120 may include an air deflector 142. Air deflector 142 may be positioned within (or disposed within) high temperature chamber 121. For instance, air deflector 142 may extend from a rear edge 1224 of base plate 122 (e.g., into high temperature chamber 121). Air deflector 142 may extend along the lateral direction L such that a width of air deflector 142 is equal to or greater than width 1221 of base plate 122. Air deflector 142 may thus form a back stop within high temperature chamber 121 (e.g., to prevent food or cooking items supplied to high temperature chamber 121 from blocking main inlet 110). Additionally or alternatively, air deflector 142 may guide the flow of heat or heated air from main inlet 110 toward a top of high temperature chamber 121 (e.g., toward an underside of top plate 126). Advantageously, the heat or heated air may be circulated within high temperature chamber before exiting via access opening 118. Air deflector may have a curved shape (e.g., semicircular) such that a concave portion faces high temperature chamber 121. However, it should be understood that a specific shape or profile of air deflector 142 may vary according to specific embodiments.

Cooking accessory 120 may include a front plate. The front plate may be provided to selectively cover at least a portion of access opening 118. For instance, the front plate may be movably (e.g., rotatably) connected to the pair of sidewalls (or to base plate 122). Accordingly, the front plate may function as a door to high temperature chamber 121. The front plate may be movable between an open position and a closed position. When in the closed position, a gap may be formed between the front plate and top plate 126 (e.g., along the vertical direction V). Thus, the flow of heat or heated air may exit via access opening 118 when the front plate is in the closed position. Moreover, the front plate may include a handle. A user may selectively pull the handle to rotate the front panel between the closed position and the open position.

Cooking accessory 120 may include a guide plate 150. Guide plate 150 may be attached to enclosing lid 124. For instance, guide plate 150 may be provided within high temperature chamber 121. According to at least some embodiments, guide plate 150 is attached to an inner surface of enclosing lid 124. Additionally or alternatively, guide plate 150 may have a width 1501 along the lateral direction L. For instance, width 1051 may be equal to or greater than width 1221 of base plate 122. Advantageously, guide plate 150 may guide or direct a flow of the heat, heated air, or gas within high temperature chamber 121 toward a food item placed on base plate 122.

Guide plate 150 may be divided into multiple portions. For instance, each individual portion of guide plate 150 may be orientated in a different direction, or define a unique angle with respect to the transverse direction T or vertical direction V. Accordingly, guide plate 150 may include a first portion 152, a second portion 154, and a third portion 156. Hereinafter, it should be noted that guide plate 150 may be provided as a single plate including one or more bends to form first portion 152, second portion 154, and third portion 156. As shown most clearly in FIG. 5, first portion 152 may include a first edge 1521 and a second edge 1522 opposite the first edge 1521 (e.g., primarily along the transverse direction T and the vertical direction V). For instance, first edge 1521 of first portion 152 may be connected with rear wall 140. According to some embodiments, first edge 1521 is connected to rear wall 140 at or near a midline (along the vertical direction V) of rear wall 140. First portion 152 may extend into high temperature chamber 121 along the transverse direction T and the vertical direction V (e.g., towards top plate 126). Second edge 1522 may be connected with top plate 126. For instance, second edge 1522 may be connected with top plate 126 at a predetermined location of top plate 126 along the transverse direction T. According to some embodiments, second edge 1522 is connected to top plate 126 above air deflector 142 along the vertical direction V. Moreover, the extending direction of first portion 152 (e.g., from first edge 1521 to second edge 1522) may be generally similar to an extending direction of air deflector 142 (e.g., within plus or minus about 15° of parallel).

Second portion 154 may include a first edge 1541 and a second edge 1542 opposite first edge 1541 (e.g., primarily along the transverse direction T and the vertical direction V). For instance, first edge 1541 may be connected with second edge 1522 of first portion 152. Accordingly, first edge 1541 of second portion 154 may be connected to top plate 126. Second portion 154 may extend into high temperature chamber 121 along the transverse direction T and vertical direction V (e.g., toward access opening 118). Second edge 1542 may be positioned within high temperature chamber 121 below top plate 126. For instance, second edge 1542 may be provided at a location between about 70% and about 80% of the height 1201 of cooking accessory 120. Accordingly, second edge 1542 may be positioned lower within high temperature chamber 121 than first edge 1541. Additionally or alternatively, second edge 1542 may be provided behind front edge 1262 of top plate 126 along the transverse direction T (e.g., closer to rear wall 140 than front edge 1262).

Third portion 156 may include a first edge 1561 and a second edge 1562 opposite first edge 1561 (e.g., primarily along the transverse direction T and the vertical direction V). For instance, first edge 1561 may be connected with second edge 1542 of second portion 154. Third portion 156 may extend generally along the transverse direction T and the vertical direction V (e.g., towards top plate 126). Accordingly, second edge 1562 may be connected with top plate 126 (e.g., proximate front edge 1262). Advantageously, a flow path of heat, heated air, or gas from burner housing 106 may be directed toward base plate 122 before being exhausted via access opening into cooking chamber 100.

Oven appliance 10 may include a cooking chamber temperature sensor 160. For instance, the cooking chamber temperature sensor 160 may be provided within cooking chamber 100. Cooking chamber temperature sensor 160 may be located at or near a top rear of cooking chamber 100. However, it should be understood that a specific location of cooking chamber temperature sensor 160 may vary according to specific embodiments. Cooking chamber temperature sensor 160 may be configured to monitor, sense, measure, or detect a temperature within cooking chamber 100. For instance, cooking chamber temperature sensor 160 may infer an average temperature at the center of cooking chamber 100.

Oven appliance 10 may include a high temperature sensor 162. High temperature sensor 162 may be provided within high temperature chamber 121. High temperature sensor 162 may be located at or near a rear of high temperature chamber 121. For instance, high temperature sensor 162 may be attached to rear wall 140 of cooking accessory 120. High temperature sensor 162 may be fixed within high temperature chamber 121 via a fastening means such as a fastener, an adhesive, a socket, a bracket, or the like. However, it should be understood that a specific location and attachment of high temperature sensor 162 may vary according to specific embodiments. High temperature sensor 162 may be configured to monitor, sense, measure, or detect a temperature within high temperature chamber 121. For instance, high temperature sensor 162 may infer an average temperature at the center of high temperature chamber 121.

As used herein, "temperature sensor" or the equivalent is intended to refer to any suitable type of temperature measuring system or device positioned at any suitable location for measuring the desired temperature. Thus, for example, temperature sensor 160 may each be any suitable type of temperature sensor, such as a thermistor, a thermocouple, a resistance temperature detector, a semiconductor-based integrated circuit temperature sensors, etc. In addition, temperature sensor (e.g., 160 or 162) may be positioned at any suitable location and may output a signal, such as a voltage, to a controller (e.g., controller 52) that is proportional to and/or indicative of the temperature being measured. Although exemplary positioning of temperature sensors is described herein, it should be appreciated that oven appliance 10 may include any other suitable number, type, and position of temperature and/or other sensors according to alternative embodiments.

Controller 52 may be configured to direct one or more cooking operations. In detail, the one or more cooking operations may include a high temperature cooking operation (e.g., performed within high temperature chamber 121 of cooking accessory 120). The high temperature cooking operation may include receiving an input for the high temperature cooking operation via control panel 22. For instance, a user may request the high temperature cooking operation by manipulating one or more of the controls 24 (or via a remote device connected with oven appliance 10). The high temperature cooking operation may include a high temperature to be reached within high temperature chamber 121.

The high temperature cooking operation may include activating the burner 112 (or heating element) at a first power level. The first power level may be associated with a first heat output (e.g., a full power heat level). Accordingly, the controller 52 may direct the burner 112 to emit heat, heated air, or gas at a full power to reach the requested temperature for the high temperature cooking operation. The heat, heated air, or gas may be supplied via first gas ports 114 and second gas ports 116. As described above, at least a portion of the heat, heated air, or gas may be supplied to high temperature chamber 121 via main inlet 110.

The high temperature cooking operation may include determining, via the high temperature sensor 162, that a temperature within the high temperature chamber 121 is above the high temperature cooking temperature set point. In detail, the high temperature sensor 162 may monitor the temperature within high temperature chamber 121 as burner 112 is operated (e.g., by continuously or repeatedly detecting a temperature value that is transmitted to or interpreted by the controller 52). When the temperature within high temperature chamber 121 reaches or exceeds the desired input temperature, the high temperature cooking operation may include activating the burner 112 at a second power level. For instance, the second power level may be less than the first power level. According to some embodiments, the second power level is equivalent to an "off" setting for burner 112 (e.g., no heat, heated air, or gas is emitted from burner 112). At this point, high temperature sensor 162 may continue to monitor the temperature within high temperature chamber 121. Additionally or alternatively, due to the size, shape, dimensions, and design of cooking accessory 120, the temperature within high temperature chamber 121 may be significantly higher than a temperature within cooking chamber 100.

For instance, according to another embodiments, the high temperature cooking operation may include determining, via the cooking chamber temperature sensor 160, that a temperature within the cooking chamber 100 is above a maximum oven temperature threshold. In detail, oven appliance 10 may have a maximum temperature limit to which cooking chamber 100 may reach. Controller 52 may determine that the temperature within cooking chamber 100 is approaching, equals, or has exceeded the maximum oven temperature threshold. At this point, the high temperature cooking operation may include deactivating the burner 112. Accordingly, no heat, heated air, or gas may be supplied or emitted from burner 112.

As would be understood, controller 52 may then determine, via each of high temperature sensor 162 and cooking chamber temperature sensor 160, the temperatures within each of the cooking chamber 100 and the high temperature chamber 121. As the measured temperatures drop, controller 52 may activate burner 112 at the first power level to resupply heat, heated air, or gas to each of cooking chamber 100 and high temperature chamber 121. For instance, controller 52 may determine that a cooking chamber 100 temperature has dropped below a minimum undershoot temperature. Additionally or alternatively, controller 52 may determine that a high temperature chamber 121 temperature has dropped below a minimum undershoot temperature. Accordingly, by utilizing each of cooking chamber temperature sensor 160 and high temperature sensor 162, controller 52 may efficiently and accurately perform the high temperature cooking operation.

As mentioned above, cooking accessory 120 may form high temperature chamber 121, in which certain foods may be cooked at relatively higher temperatures than within the cooking chamber 100. For one example, a pizza cooking operation is performed within high temperature chamber 121 while a potato roasting operation is performed within cooking chamber 100. According to this example, with direct heat supplied to the interior and exterior of cooking accessory 120, temperatures within high temperature chamber may reach up to or exceeding about 1200° F. However, due to the flow of the heat or heated air, the temperature within cooking chamber 100 may remain around or below about 500° F. Thus, dual cooking operations may notably be performed within oven appliance 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking accessory receivable within a cooking chamber of an oven appliance defining a vertical direction, a lateral direction, and a transverse direction, the cooking accessory comprising:
   a base plate to receive a food item thereon;

an enclosing lid disposed over the base plate, the enclosing lid defining a main inlet and an access opening, the main inlet being defined along the vertical direction at a bottom of the cooking accessory between the base plate and the enclosing lid, and the access opening being defined along the transverse direction between the base plate and the enclosing lid; and a guide plate attached to an interior surface of the enclosing lid above the base plate, wherein the guide plate comprises:
  a first portion having a first edge connected to the rear wall and a second edge connected to the top plate the first portion being positioned above the main inlet along the vertical direction;
  a second portion extending from the second edge of the first portion into the high temperature chamber; and
  a third portion connecting the second portion to the top plate, and
wherein the base plate and the end enclosing lid form a high temperature chamber for the food item, the high temperature chamber being in fluid communication with the cooking chamber.

2. The cooking accessory of claim 1, wherein the enclosing lid comprises:
  a top plate disposed above the base plate;
  a pair of sidewalls extending from the top plate towards the base plate; and
  a rear wall extending downward from the top plate towards the base plate, the pair of sidewalls being connected with the rear wall, wherein the main inlet is defined between the base plate and the rear wall.

3. The cooking accessory of claim 2, wherein a width of the main inlet along the lateral direction is greater than or equal to a width of the base plate along the lateral direction.

4. The cooking accessory of claim 2, further comprising:
  an air deflector provided within the high temperature chamber, wherein the air deflector extends from the base plate into the high temperature chamber to direct hot air introduced to the high temperature chamber via the main inlet towards the access opening, wherein the air deflector comprises a concave portion facing the high temperature chamber.

5. The cooking accessory of claim 4, wherein a width of the air deflector along the lateral direction is greater than or equal to a width of the base plate along the lateral di recti on.

6. The cooking accessory of claim 2, wherein the cooking accessory defines a height along the vertical direction and a width along the lateral direction, and wherein a ratio of the height to the width is between 1:3 and 1:5.

7. The cooking accessory of claim 1, wherein a width of the guide plate along the lateral direction is greater than or equal to a width of the top plate along the lateral di recti on.

8. An oven appliance defining a vertical direction, a lateral direction, and a transverse direction, the oven appliance comprising:
  a cabinet forming a cooking chamber and a heating element chamber provided below the cooking chamber, the cabinet comprising a control panel;
  a heating element provided within the heating element chamber;
  a cooking accessory positioned between the heating element chamber and the cooking chamber, the cooking accessory forming a high temperature chamber in fluid communication with the cooking chamber, the cooking accessory defining a main inlet at a bottom thereof along the vertical direction, wherein the main inlet is positioned proximate the heating element;
  a high temperature sensor positioned within the high temperature chamber, the high temperature sensor configured to monitor a temperature within the high temperature chamber; and
  a cooking chamber temperature sensor positioned within the cooking chamber, the cooking chamber temperature sensor configured to monitor a temperature within the cooking chamber.

9. The oven appliance of claim 8, further comprising a controller configured to direct a cooking operation, the cooking operation comprising:
  receiving an input for a high temperature cooking operation via the control panel;
  activating the heating element at a first power level;
  determining, via the high temperature sensor, that a temperature within the high temperature chamber is above a high temperature cooking temperature set point; and
  activating the heating element at a second power level less than the first power level in response to determining that the temperature within the high temperature chamber is above the high temperature cooking temperature set point.

10. The oven appliance of claim 9, wherein the cooking operation further comprises:
  determining, via the cooking chamber temperature sensor, that a temperature within the cooking chamber is above a maximum oven temperature threshold; and
  deactivating the heating element in response to determining that the temperature within the cooking chamber is above the maximum oven temperature threshold.

11. The oven appliance of claim 8, wherein the cooking accessory comprises:
  a base plate to receive a food item thereon;
  an enclosing lid disposed over the base plate, the enclosing lid defining a main inlet and an access opening, the main inlet being defined along the vertical direction and the access opening being defined along the transverse direction; and
  a guide plate attached to an interior surface of the enclosing lid,
  wherein the base plate and the enclosing lid form a high temperature chamber for the food item, the high temperature chamber being in fluid communication with the cooking chamber.

12. The oven appliance of claim 11, wherein the enclosing lid comprises:
  a top plate disposed above the base plate;
  a pair of sidewalls extending from the top plate towards the base plate; and
  a rear wall extending downward from the top plate towards the base plate, the pair of sidewalls being connected with the rear wall, wherein the main inlet is defined between the base plate and the rear wall, and wherein a front edge of the base plate is positioned closer to a front of the cabinet than a front edge of the top plate.

13. The oven appliance of claim 12, wherein the guide plate comprises:
  a first portion having a first edge connected to the rear wall and a second edge connected to the top plate;
  a second portion extending from the second edge of the first portion into the high temperature chamber; and
  a third portion connected the second portion to the top plate.

14. The oven appliance of claim 12, wherein a width of the guide plate along the lateral direction is greater than or equal to a width of the top plate along the lateral direction.

15. The oven appliance of claim 14, wherein a width of the main inlet along the lateral direction is greater than or equal to a width of the base plate along the lateral direction.

16. The oven appliance of claim 12, further comprising:
an air deflector provided within the second cooking chamber, wherein the air deflector extends from the base plate into the high temperature chamber to direct hot air introduced to the high temperature chamber via the main inlet towards the access opening.

17. The oven appliance of claim 16, wherein a width of the air deflector along the lateral direction is greater than or equal to a width of the base plate along the lateral direction.

18. The oven appliance of claim 8, wherein the heating element is a gas burner comprising a plurality of first gas ports and a second plurality of gas ports different from the first plurality of gas ports.

19. The oven appliance of claim 8, wherein the cooking accessory is removably accommodated within the cooking chamber spaced apart from a bottom wall of the cooking chamber.

* * * * *